US012269205B2

(12) United States Patent
Pascual et al.

(10) Patent No.: US 12,269,205 B2
(45) Date of Patent: *Apr. 8, 2025

(54) EYEWEAR LENS CREATION USING ADDITIVE TECHNIQUES WITH DIFFUSE LIGHT

(71) Applicant: Indizen Optical Technologies S.L., Madrid (ES)

(72) Inventors: Eduardo Pascual, Madrid (ES); José Alonso Fernández, Madrid (ES); Ignacio Canga, Madrid (ES); Juan Antonio Quiroga Mellado, Madrid (ES); Daniel Crespo Vázquez, Torrance, CA (US)

(73) Assignee: Indizen Optical Technologies S.L., Madrid (ES)

( * ) Notice: Subject to any disclaimer, the term of this patent is extended or adjusted under 35 U.S.C. 154(b) by 19 days.

This patent is subject to a terminal disclaimer.

(21) Appl. No.: 18/184,554

(22) Filed: Mar. 15, 2023

(65) Prior Publication Data
US 2023/0219287 A1    Jul. 13, 2023

Related U.S. Application Data

(63) Continuation of application No. 17/072,456, filed on Oct. 16, 2020, now Pat. No. 11,633,907.

(51) Int. Cl.
*B29C 64/124* (2017.01)
*B29C 64/255* (2017.01)
(Continued)

(52) U.S. Cl.
CPC .......... *B29C 64/124* (2017.08); *B29C 64/255* (2017.08); *B29C 64/264* (2017.08);
(Continued)

(58) Field of Classification Search
CPC .......... G02B 1/14; G02B 1/041; G02B 1/043; B29C 64/124; B29C 64/129;
(Continued)

(56) References Cited

U.S. PATENT DOCUMENTS 8,157,373 B2   4/2012   Widman et al.
9,952,448 B2   4/2018   Vázquez et al.
(Continued)

OTHER PUBLICATIONS

Rodriguez et al. (Affidavit filed Jan. 7, 2019 for U.S. Appl. No. 15/004,567 provided by Applicant for instant application) (Year: 2019).*

(Continued)

*Primary Examiner* — Galen H Hauth
*Assistant Examiner* — Ariella Machness
(74) *Attorney, Agent, or Firm* — SoCal IP Law Group LLP; Angelo J. Gaz; Mark A. Goldstein

(57) ABSTRACT

Systems and methods for lens creations are disclosed. The method includes initiating light transmission from a light source through a diffuser into a container holding resin and a substrate. The light transmission is performed according to an irradiation pattern wherein each point in the resin is illuminated by at least 10% of the diffuser. This causes a lens to be formed. To achieve this illumination, at least 15% of the diffuser receives light from the light source. Further, a diameter of the diffuser is greater than or equal to a diameter of the substrate. The system performing the methods includes a polymerization apparatus and may include a resin conditioning and reservoir apparatus, a metrology unit, a resin drainage apparatus and an optional postcuring apparatus.

23 Claims, 13 Drawing Sheets

(51) Int. Cl.

| | |
|---|---|
| *B29C 64/264* | (2017.01) |
| *B29C 64/35* | (2017.01) |
| *B29C 64/386* | (2017.01) |
| *B29C 64/393* | (2017.01) |
| *B29D 11/00* | (2006.01) |
| *B29K 105/00* | (2006.01) |
| *B29L 11/00* | (2006.01) |
| *B33Y 10/00* | (2015.01) |
| *B33Y 30/00* | (2015.01) |
| *B33Y 40/20* | (2020.01) |
| *B33Y 50/02* | (2015.01) |
| *B33Y 80/00* | (2015.01) |
| *G02B 1/04* | (2006.01) |
| *G02B 1/14* | (2015.01) |
| *G02C 7/02* | (2006.01) |

(52) U.S. Cl.
CPC .......... *B29C 64/386* (2017.08); *B29C 64/393* (2017.08); *B29D 11/00009* (2013.01); *B29D 11/00865* (2013.01); *B29D 11/00951* (2013.01); *B33Y 10/00* (2014.12); *B33Y 30/00* (2014.12); *B33Y 50/02* (2014.12); *B33Y 80/00* (2014.12); *G02B 1/041* (2013.01); *G02B 1/14* (2015.01); *G02C 7/02* (2013.01); *B29C 64/35* (2017.08); *B29K 2105/0002* (2013.01); *B29K 2105/0005* (2013.01); *B29L 2011/0016* (2013.01); *B33Y 40/20* (2020.01)

(58) Field of Classification Search
CPC ... B29C 64/135; B29C 64/264; B29C 64/255; B29C 64/35; B29C 64/386; B29C 64/393; B29D 11/00009; B29D 11/00865; B29D 11/00951; G02C 7/02; B29K 2105/0002; B29K 2105/0005; B29L 2011/0016
See application file for complete search history.

(56) References Cited

U.S. PATENT DOCUMENTS

| | | | |
|---|---|---|---|
| 2005/0104240 A1* | 5/2005 | Jethmalani | G02C 7/02 356/124 |
| 2013/0075957 A1 | 3/2013 | Swanson et al. | |
| 2015/0277146 A1* | 10/2015 | Crespo Vázquez | B29D 11/00009 264/1.36 |
| 2017/0210072 A1* | 7/2017 | Rodriguez | G02B 1/10 |
| 2020/0033270 A1 | 1/2020 | Wynne et al. | |
| 2020/0039118 A1* | 2/2020 | Panzer | B33Y 10/00 |
| 2021/0086450 A1* | 3/2021 | Murillo | B29C 64/35 |
| 2021/0387420 A1 | 12/2021 | Greene et al. | |

OTHER PUBLICATIONS

Vitale, A., Hennessy, M., Matar, O., & Cabral, J. (Publication Date:Dec. 22, 2014). Interfacial Profile and Propagation of Frontal Photopolymerization Waves. Macromolecules, 48(1), 198-205. doi: 10.1021/ma5021215, 8 total pages.

Kewitsch, A., & Yariv, A. (Published Jan. 1, 1996). Self-focusing and self-trapping of optical beams upon photopolymerization. Optics Letters, 21(1), 24. doi: 10.1364/ol.21.000024, 3 total pages.

Rodriguez et al., Affidavit field Jan. 7, 2019 for U.S. Appl. No. 15/004,567 (year 2019).

* cited by examiner

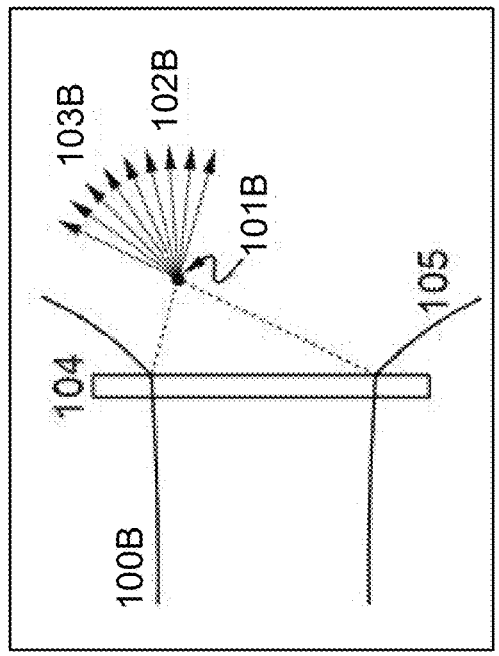
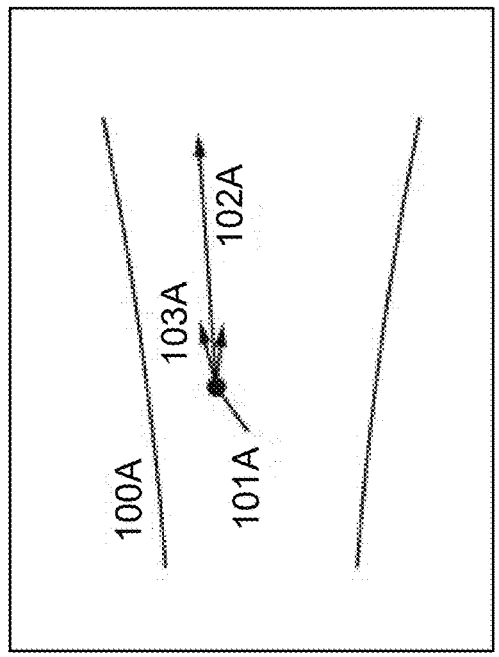
FIG. 1A
FIG. 1B

EYEWEAR LENS CREATION USING ADDITIVE TECHNIQUES WITH DIFFUSE LIGHT

RELATED APPLICATIONS

The present application is a continuation of U.S. application Ser. No. 17/072,456, filed Oct. 16, 2020, under the same title, of which is hereby incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to creation of ophthalmic lenses, and, in particular, to creating ophthalmic lenses using additive techniques.

Description of the Related Art

The current technology for producing spectacle lenses is based on a cut and polish technology called "free-form". This process involves several machines: a blocker, generator, and polisher. These machines are expensive, bulky and require a great amount of expertise to maintain. In addition, this technology generates a lot of waste, and requires several consumables, some of them toxic. Also, this technology requires a large inventory of semi-finished lenses. It follows that setting up a free-form manufacturing facility requires a significant economic investment, a large workforce, and a large facility. This keeps lens manufacturing the domain of large companies.

With the advent of 3D printing, efforts have begun to implement lens creating using 3D printing technology. However, current 3D printing systems for lens creation are large in size and extremely expensive. Moreover, they are very slow, requiring 15 minutes to produce one lens. Other approaches based on variations of SLA (stereo-lithography) are less expensive, but still bulky and similarly slow.

One 3D printing technology used for lens creation is known as "resin-jet". It is based on layer-by-layer fabrication over a flat surface. The layers are composed of small UV-curable droplets that make the created surface smooth, which results in a surface with sufficient optical quality. However, there are large drawbacks with resin-jet technology. One drawback is manufacturing time. The reported printing time for one lens with resin-jet technology is roughly one hour. The process is slow because it stacks layers one by one. Further, the machine to implement resin-jet technology is large, with a big footprint. Plus, it is more expensive than the set blocker, generator, and polisher apparatus needed for "free-form" subtractive technology.

Another drawback of the resin-jet technology is that it only produces lenses with flat surfaces. This is problematic because spectacle lenses usually have a curved or meniscus shape. One solution is to merge two lenses with flat surface, resulting in one meniscus-shaped lenses. However, this requires two prints, which is time consuming. Plus, the resulting lens is very thick.

To move lens making into the offices of eye care professionals and make lens creation available to small business, a simple, quick and inexpensive lens creation system with a small footprint is needed.

DESCRIPTION OF THE DRAWINGS

FIG. 1A is a drawing showing a directional light beam.

FIG. 1B is a drawing showing a non-directional light beam.

DETAILED DESCRIPTION

Figure 2:
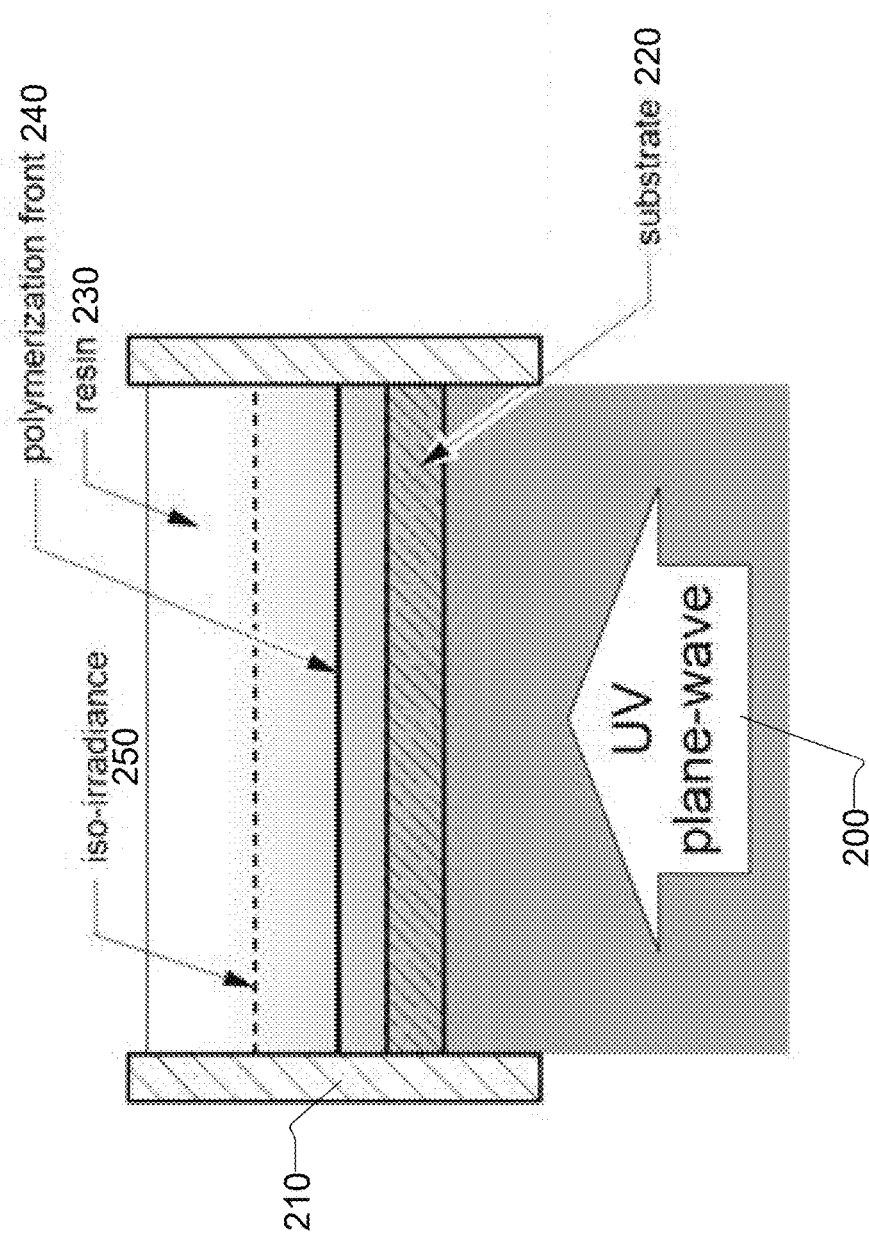
FIG. 2 is a drawing showing light propagation within resin.

The methods and systems described herein describe a system for the production of spectacle lenses using additive techniques and light passed through a diffuser according to creation instructions based on a wearer's prescription and usage requirements. The creation instructions include specification of an irradiation pattern. According to the systems and methods described herein, light is transmitted from a light source through a diffuser into a container holding resin and a substrate. The light transmission is performed according to the irradiation pattern. The irradiation pattern includes instructions specifying that each point in the resin is illuminated by at least 10% of the diffuser. In some embodiments, to achieve this illumination, at least 15% of the diffuser receives light from the light source. Further, in some embodiments, a diameter of the diffuser is greater than or equal to a diameter of the substrate. Additional details about the systems and methods are provided below.

The methods and systems described herein describe a system for the production of spectacle lenses that is simpler than the current "free-form" technology. The system described herein is lightweight, has limited movable pieces, results in less waste than "free-form" production and requires a highly reduced use of consumables when compared to "free-form" production. This results in less expensive systems that will enable smaller enterprises, including opticians, to enter the business of producing spectacle lenses.

To better understand the systems and methods described herein, an understanding of directional and non-directional light beams is helpful. FIGS. 1A and 1B provide a comparison between directional and non-directional light beams. A directional light beam is a beam of light for which radiance, at any point in the beam, has non-negligible values within a narrow solid angle around a single direction. Examples of directional light beams are collimated beams, or spherical beams coming from a point source. A non-directional (or diffuse) light beam is a beam of light for which radiance, at any point in the beam, has non-negligible values for a finite range of directions. According to the systems and methods described herein, nondirectional beams result from light passing through a light diffuser.

Referring now to FIG. 1A, a directional light beam (100A) is shown. For any point (101A) within a directional light beam (100A), radiance is non-negligible along a single direction (102A). In close directions (103A) radiance goes to zero or very low values, and is zero for any other direction. Referring now to FIG. 1B, if a directional light beam (100B) passes through a light diffuser (104) the directional light beam becomes non-directional or diffuse (shown as 105), and it is characterized by having non-negligible radiance at a significant set of directions (102B), (103B) for any point within the diffuse light beam (101B). The systems and methods described herein include a diffuser to guide light to cause a polymerization reaction in resin to produce eyeglass lenses.

Polymerization of Photocurable Resins

Photopolymerization is a type of polymerization in which light is used to initiate the polymerization reaction. It has two routes, free-radical and ionic. Most examples in this disclosure are based on free-radical polymerization, but ionic polymerization can be used as well. The reaction is triggered by a photosensitive component called the initiator, which is mixed within the liquid monomer. Typically, the light wavelength is in the ultraviolet range (such as, for example, UV-A or actinic UV), although some initiators can be activated with visible light or other wavelengths. In some embodiments, the initiator has an absorption band covering from 360 nm to 390 nm.

As used herein, the term "resin" refers to a mixture including a monomer base, an initiator and, in some embodiments, an inhibitor. That is, an inhibitor is optional. The resin is in a liquid state and may include other components, such as stabilizers, photoabsorbers, etc. Example resin bases include acrylate, epoxy, methacrylate, isocyanate, polythiol, thioacrylate, thiomethacrylate. Example acrylate resins include pentaerythritol tetraacrylate; 1,10-decanediol diacrylate; and others. The initiators may be free-radical or cationic. When using free-radical polymerization, example initiators include benzophenone, BAPO (bisacylphosphine oxides), acetophenone, 1-[4-(2-Hydroxyethoxy)-phenyl]-2-hydroxy-2-methyl-1-propane-1-one (Irgacure 2959(c) from CIBA), alpha amino ketones, HAP (2-Hydroxy-2-methyl-1-phenyl-propan-1-one) and TPO (Diphenyl(2,4,6-trimethyl-benzoyl)phosphine oxide), and others. When using a cationic photo-initiator, example initiators are aryldiazonium salts, triarylsulfonium salts, ferrocenium salts, diaryliodonium salts, and others. An example inhibitor is hydroquinone.

When the initiator molecule absorbs an UV photon, the molecule is divided into free-radicals that react with the monomer. The result of this reaction is a monomer attached to a free-radical, which subsequently reacts with more monomer molecules and creates a polymer with growing molecular weight. The reaction finishes when the free-radical chain end is neutralized, which typically may happen by termination or by chain transfer to an inhibitor.

The reactions that occur during polymerization are dissociation, initiation, propagation, termination and chain transfer to an inhibitor, as represented by the following equations:

$$\text{Dissociation: } [A] + I_{abs} \xrightarrow{k_d} 2[R\cdot] \quad (1)$$

$$\text{Initiation: } [R\cdot] + [M] \xrightarrow{k_i} [M\cdot]_1$$

$$\text{Propagation: } [M\cdot]_n + [M] \xrightarrow{k_p} [M\cdot]_{n+1}$$

$$\text{Termination: } [M\cdot]_n + [M\cdot]_m \xrightarrow{k_t} [M]_{n+m}$$

$$\text{Chain transfer to an inhibitor: } [M\cdot]_n + [Z] \xrightarrow{k_z} [M_nZ]$$

Here [A] is the initiator concentration, [R·] is the free-radicals concentration, [M] is the monomer concentration, $[M\cdot]_i$ is an active (with attached free-radical) polymer composed of i monomers, $[M]_i$ is a stable polymer composed of i monomers, [Z] is the concentration of a particular inhibitor that may be present and $[M_nZ]$ is the concentration of polymer that reacted with the inhibitor. Parameters $k_d$, $k_i$, $k_p$, $k_t$, and $k_z$ are the kinetic constants for each reaction. $I_{abs}$ is the amount of UV radiation energy absorbed by the initiator.

These reactions are generally solved under the assumption of steady state, where the free radicals generated by the dissociation of the photoinitiator are consumed by polymerization termination (both recombination and inhibition). The rate of change of the monomer concentration is given by the following equation:

$$\frac{d[M]}{dt} = -k_p[M]\frac{[Z]k_z - \sqrt{[Z]^2k_z^2 + 16\phi I_{abs}k_t}}{4k_t} \quad (2)$$

In this formula, the inhibitor concentration [Z] might depend on time. The variable $\phi$ indicates the initiator quantum efficiency. Also, $k_z$, $k_t$ and $k_p$ depend on the temperature through the Arrhenius relation. For example, for $k_p$ $$k_p = k_{po} e^{-\frac{E_p}{RT}}, \quad (3)$$

where $k_{po}$ is a constant, $E_p$ is the energy involved in the propagation reaction and R is the gas constant. Because the polymer propagation reaction is exothermic, it is expected the kinetic constants change over time.

Solving the differential equation (2) requires numerical integration algorithms, but under some approximations, analytic solutions illustrate the methods described herein. In a applying the methods described herein, numerical solutions to equation (2) can be used, and depending on the required accuracy, approximate analytical solutions can also be used. When there is no inhibitor and the temperature is constant, the monomer concentration over time is given by the following equation:

$$[M](t) = [M_0]e^{-k_p t \sqrt{\frac{\phi I_{abs}}{k_t}}}, \quad (4)$$

where $M_0$ is the initial monomer concentration. The polymer created at the same time as the monomer is consumed during polymerization. The degree of conversion c is the proportion of monomer converted into polymer shown by the equation:

$$c = \frac{[M](t) - [M_0]}{[M_0]} \quad (5)$$

When the conversion rate increases, the viscosity of the media increases. When the conversion reaches a certain point called the critical conversion $c_{cr}$, the viscosity increases exponentially, and the mixture solidifies due to the low mobility of the large polymer molecules and/or high density of crosslinks between polymer chains.

When directional light is applied to the photocurable resin, the irradiance absorbed per unit length by the initiator after propagation through a depth z in the resin, is obtained from the Lambert-Beer law according to this equation:

$$I_{abs} = [A]I_0 \alpha e^{-[A]\alpha z - \gamma z} \quad (6)$$

Here $\alpha$ is the molar absorption coefficient of the initiator, z is the depth inside the material, $\gamma$ is the absorption coefficient of the resin without the initiator and $I_0$ the input intensity. As such, the absorption is maximum at the beginning of the material and decays exponentially inside.

When a resin in a container is irradiated with directional light, the polymerization rate is faster closer to the material interface and will decay exponentially inside the material. At a given time a certain part of the material will reach the critical conversion as depicted in FIG. 2. All material below this point will be a solid and all material above it will be a liquid. We call this frontier the "polymerization front" shown as 240. Referring now to FIG. 2, light 200 propagation passing through a transparent substrate 220 inside a container 210 holding resin 230 is shown. The dashed line 250 represents surfaces with the same irradiance.

During light exposure, the polymerization front propagates with logarithmic speed inside the resin 230. When the exposure is stopped, a layer whose thickness depends on exposure time results. The thickness of the cured material is given by the equation:

$$T(t) = \frac{1}{[A]\alpha} \ln\left(\frac{[A]I_0 \alpha k_p^2 \phi t^2}{k_t \ln(1 - c_{cr})^2}\right) \quad (7)$$

This equation (7) can only be applied with directional light when all parameters are constant with time.

Figure 3:
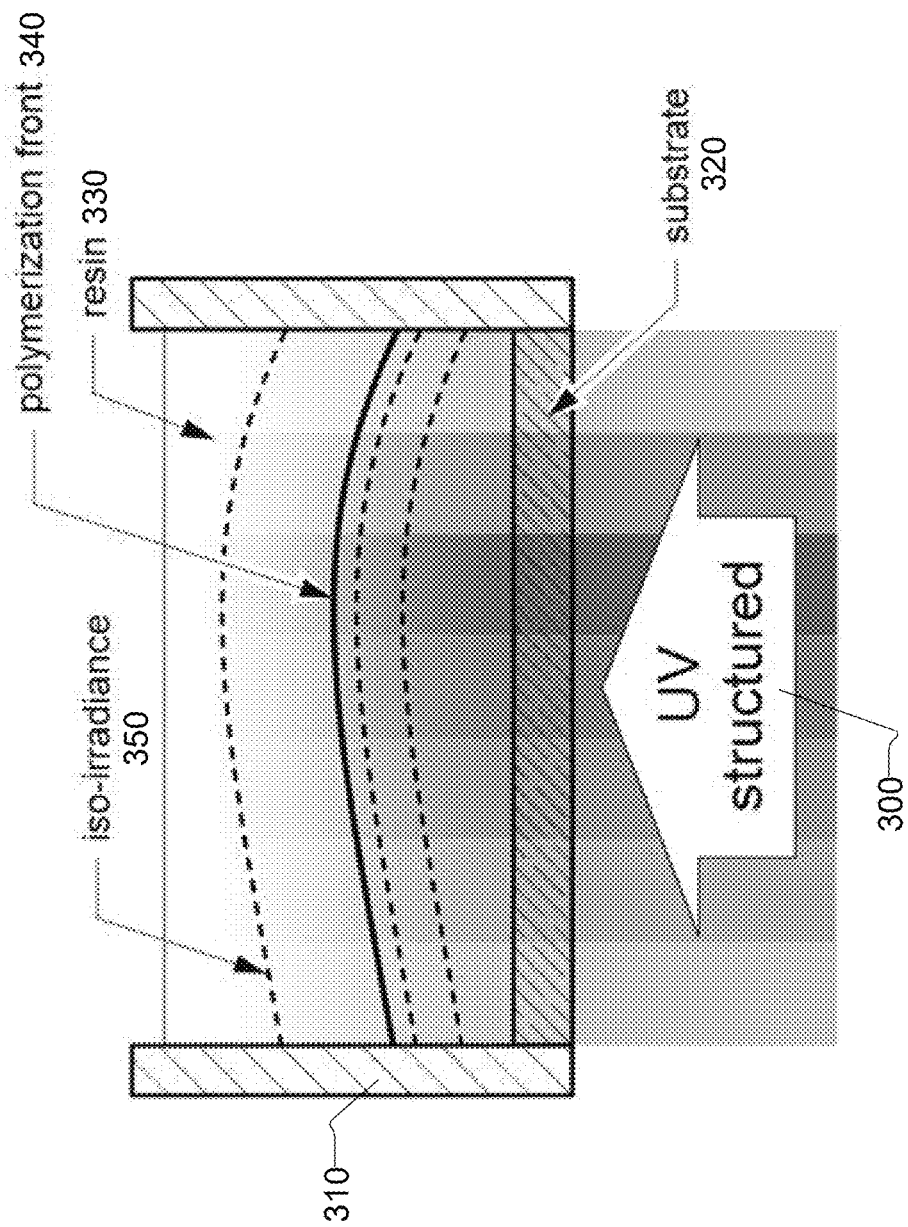
FIG. 3 is a drawing showing propagation of patterned light within resin.

When the projected light is patterned, the shape of the polymerization front follows the radiance pattern, as shown in FIG. 3. FIG. 3 shows the light 300 propagation through the resin 330 in a container 310. Here, the light is directional but presents a transverse distribution which modifies the shape of the polymerization front 340 as well as the shape of the surfaces with same irradiance 350.

When the combination of exposure time and input UV irradiance pattern are correctly calibrated, the shape of the polymerization front can be controlled according to equation (7) and more precisely by numerical integration of equation (2). This technique can be used to make a variety of three-dimensional objects. However, the resulting three-dimensional objects typically lack transparency and optical quality because of self-focusing, as explained below. For this reason, this technique alone, which uses directional light, is not enough to make spectacle lenses.

As used herein, "spectacle lens" refers to any type of eyewear that is worn a small distance from the wearer's eye. Spectacle lenses can include: spherotorical lenses, aspherical lenses, progressive addition lenses, bifocals, trifocals, lenticulars, slab offs, etc. The typical spectacle lenses made may be from 40 to 80 mm in diameter and have a thickness of from 2 to 8 mm. The systems and methods described herein may also be used to make larger and smaller lenses, as well as thinner and thicker lenses.

The systems and methods described herein are used to create spectacle lenses which may have fixed surfaces or free-form surfaces. For a fixed surface lens, the lens is produced from resin that adheres to the substrate. As shown in FIGS. 2 and 3, the fixed surface of the substrates 220 and 320 are flat, but the substrate can have any shape. The most convenient substrate shape for spectacle lenses is a spherical surface. However, more complex substrate surfaces can be used, such as aspherical, torical, atorical, multifocal, etc. In some embodiments, electronic circuits or image formation systems can be embedded inside the substrate. In other embodiments, the substrate is constructed or augmented to allow for the productions of lenses with large edge thickness. In one such embodiment, the substrate may be aspherized, lenticularized toward the edge to increase the amount of resin that can be held. In another such embodiment, a cylindrical wall is attached to the substrate edge to increase the amount of resin that can be held. The substrate can be made of polycarbonate, allyl diglycol carbonate, polyurethane-based plastic, glass, or similar materials, and may be CR-39® or TRIVEX® available from PPG Industries Ohio, Inc. of Cleveland, Ohio.

In the embodiments described herein, the fixed surface represents the surface that is farthest from the eye. In other embodiments, the order can be reversed such that the fixed surface represents the surface that is closest to the eye. The free-form surface is the surface determined by the location of the polymerization front. In the following embodiments, the free-form surface is the surface closest to the eye.

Self-Focusing

Figure 4:
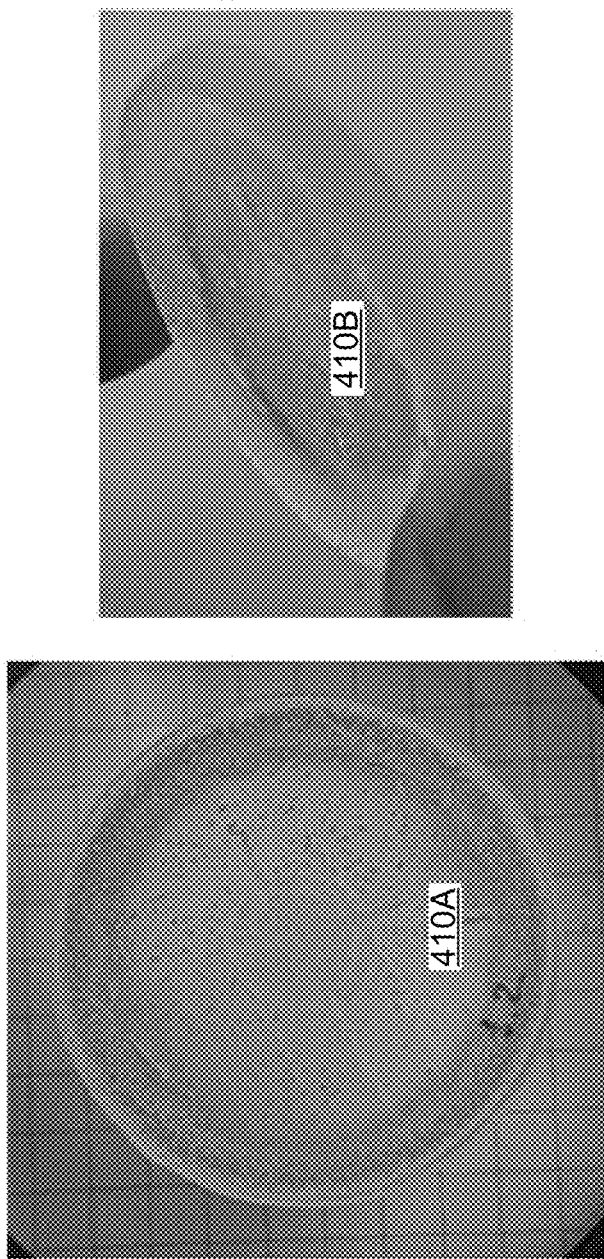
FIG. 4 are photographs of a lens created with directional light.

As described above, a directional light beam with adequate distribution of irradiance may be used to create a controlled polymerization front in resin, so the shape of the free-form surface provides the desired spectacle lens. However, directional light beams are prone to create strong defects in the polymerized materials because of what is known as the self-focusing effect. The refractive index of the polymer is typically slightly larger than the refractive index of the liquid resin. Any minute deviation of the local value of the irradiance impinging on the liquid resin, (the deviation can be present on the profile as noise, which is inevitable in directional light, can be due to dust particles or defects on the transparent surfaces holding the resin, and can result from the pixel structure of the projector) will cause a local variation of the refractive index that in turn will locally focus the irradiance. This creates a positive feedback loop that produces a distinctive defect, typically in the form of the shape of a needle oriented along the direction of propagation of the radiance. As a result, the generated polymer loses transparency, and the free-form surface becomes spiky such that the resulting object has no or poor optical quality. This is shown in the images of a lens created with directional light in FIG. 4 in which 410A is a top view and 410B is a perspective view. To overcome this, the methods and systems described herein use diffused light instead of directed light.

Light Diffuser

When a light diffuser is placed between a light projector and resin, the light from each radiant pixel is scattered into multiple angles such that the light does not follow the initial direction from the projector. (See the discussion of FIGS. 1A and 1B above.) To implement the methods described herein, it is preferable to have a diffuser with properties as close to conforming to Lambert's cosine law as possible. As described below, the properties of the diffuser are evaluated to measure how close to the ideal/Lambertian the diffuser is using a bidirectional transmission distribution function (BTDF). For an ideal diffuser, the radiance follows Lambert's cosine law. Measurements using BTDF are taken to evaluate the properties of the diffuser. The diffuser is made from light diffusing materials which include glass and polymers manufactured with light diffusing additives. More specifically, the diffuser may be made from opal glass, white glass, acrylate sheets with calcium carbonate additives, and others. In one embodiment, an example light diffuser is an acrylate sheet that is 2 mm thick and is made with 3.3 wt % $CaCO_3$ additive.

Figure 5:
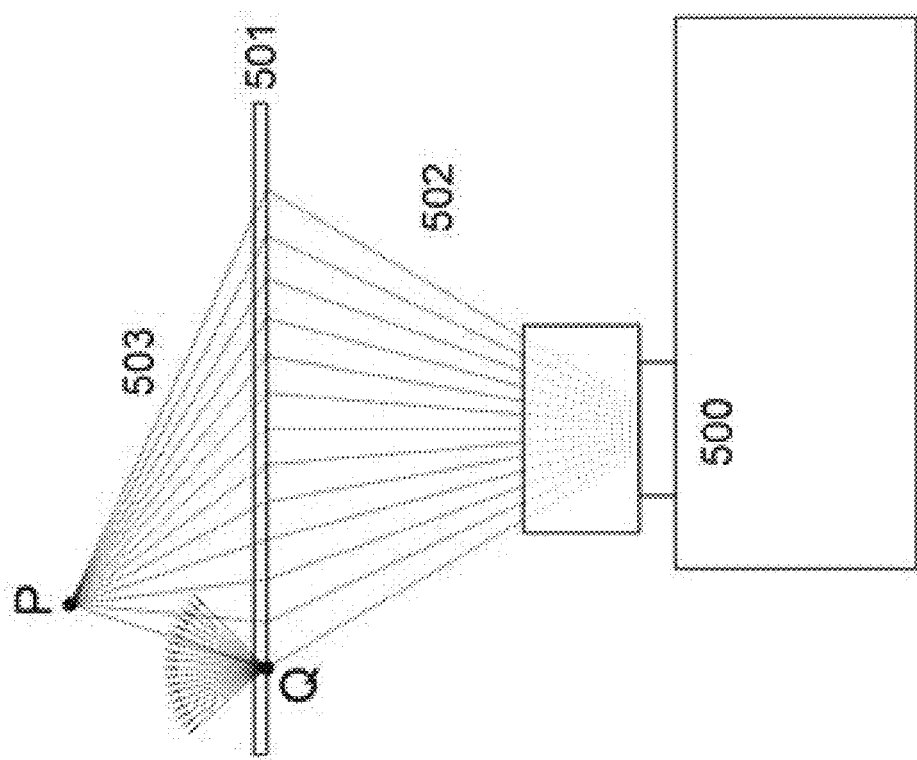
FIG. 5 is a drawing showing the effect of a light diffuser on directional light.

Referring now to FIG. 5, there is shown a schematic drawing showing the impact of light diffuser 501 on light 502. The light source 500 sends radiant energy (that is, light) 502 toward diffuser 501. The light source 500 may be, for example, an ultraviolet Digital Light Processing (UV DLP) projector or a scanned UV laser. For example, the projector 500 may emit radiation (that is, UV light) with a peak at 385 nm. The light emitted 502 by the source is highly directional. The diffuser 501 scatters light in all directions, so any point Q on the diffuser will emit light in all directions. The radiance of the scattered light is dependent on the bidirectional transmission distribution function of the diffuser. Hence, the flux reaching any point P behind the diffuser has contributions 503 from multiple points on the diffuser.

According to the systems and methods described herein, the diffuser is located inside and preferably at the bottom of a container, vat or chamber of resin. When the diffuser is located at the bottom of a container filled with resin, every point within the resin receives light from multiple points on the diffuser and from multiple directions. In one embodiment, each point in the resin receives light from at least 10% of the diffuser area. As such, the light transmitted from the diffuser to and through the resin is not directional, eliminating the self-focusing problem described above. To achieve this—that is, so that every point in the resin receives light from multiple source locations on at least 10% of the diffuser—a substantial part of the diffuser is illuminated. Specifically, in some embodiments, at least 15% of the diffuser area is illuminated by a light source. If this does not occur, the self-focusing will remain or not be fully removed. Using the method of at least 15% illumination of the diffuser to illuminate each point in the resin with at least 10% of the light from the diffuser results in a polymerized lens with a free-form surface this is smooth, transparent and having low haze. The resulting lens has good optical quality. An advantage of this technique is that the system is tolerant to dust, dirt or any imperfections in the projector or the media between the projector and the resin container.

Controlling the Shape of the Polymerization Front

To create desired eyeglass lenses, the shape of the polymerization front must be controlled. A precise model of the polymerization inside a container of resin takes into consideration each of the following:

Irradiance propagation from the diffuser to the substrate and into the lens.

Temporal evolution of polymer, initiator, and inhibitor concentration.

Heat diffusion and temporal evolution of temperature.

Monomer, initiator, and inhibitor diffusion.

Bidirectional transmission distribution function (BTDF) of the light diffuser.

When using diffuse light, equation (7) no longer applies. Also, equation (3) cannot be applied when parameters such as reaction rates, initiator, or inhibitor concentrations changes over time. Therefore, a careful modeling of the reactions (1) is needed when using diffuse light.

The desired shape of the free-form lens surface may be referred to as $z_L(x,y)$. The differential equations corresponding to equations (1) are numerically solved for a given input irradiance pattern I to obtain the polymerization front $z_P(x, y, I)$. For a fixed set of control points $(x_i, y_i)$ the following merit function is computed:

$$M(I) = \sum_i w_i [z_P(x_i, y_i, I) - z_L(x_i, y_i)]^2 \tag{8}$$

The merit function is minimized with respect to the parameters defining the input irradiance pattern or "input pattern" for short. When the light source is a DLP, the irradiance pattern impinging on the diffuser is defined pixel-wise and is represented as a matrix $I_{nm}$, where the indices n and m run over the rows and columns of the digital image. Other merit functions may be used, such as the sum of the differences between the curvatures of the target (the free form surface) and the polymerization front.

During the process of monomer polymerization, the input patterns $I_{nm}$ can be modified with the information provided by one or more sensors or sensor systems which are used to measure the resin in the container and the polymerization front as it grows. This real-time close-loop process allows for tight control of the polymerization front and avoids or cancels instabilities that could affect its shape. The sensors and sensor systems used in the polymerization process include one or more a visual inspection system (VIS) camera, an infrared (IR) camera, an ultrasound topography system, a tomography system, a moiré topography system, an interferometric topography system, temperature sensors, and other similar devices and systems. These techniques are used in the polymerization apparatuses shown in and described regarding FIGS. 7A and 7B below and the metrology system described below and shown in FIG. 10.

Description of System and Constituent Apparatus

The lens producing system described herein includes, but is not limited to, the following components:

Resin conditioning and reservoir apparatus,

Polymerization apparatus,

Metrology apparatus,

Resin drainage apparatus, and

Postcuring apparatus.

Resin Conditioning and Reservoir Apparatus

The creation and evolution of the polymerization front depends on multiple parameters, as described above. For this reason, tight control over the resin formulation is maintained. The resin includes a combination of inhibitor and photoinitiator. The inhibitor and photoinitiator must be stored and used at particular temperatures.

One inhibitor of chain photopolymerization reactions is oxygen. The oxygen may be diffused inside the resin from the surrounding air, a process that produces a concentration gradient inside the resin. This gradient could result in an inhomogeneous resin that might disrupt the shape of the polymerization front. For this reason, the concentration of any inhibitor inside the resin, including oxygen, must be kept at a known appropriate and constant level. The components of the resin must be homogeneous before an input pattern is projected.

To achieve a homogeneous resin having an appropriate concentration of oxygen, some of the possible options are:
  Store the resin in container with an oxygen-free atmosphere (for example nitrogen).
  Use an oxygen scavenger that is compatible with the resin.
  Saturate the resin with oxygen.
  Saturate the resin with a gas with a certain percentage of oxygen (for example air), which ensures a constant concentration of oxygen below saturation.
  De-gas the resin.

Figure 6:
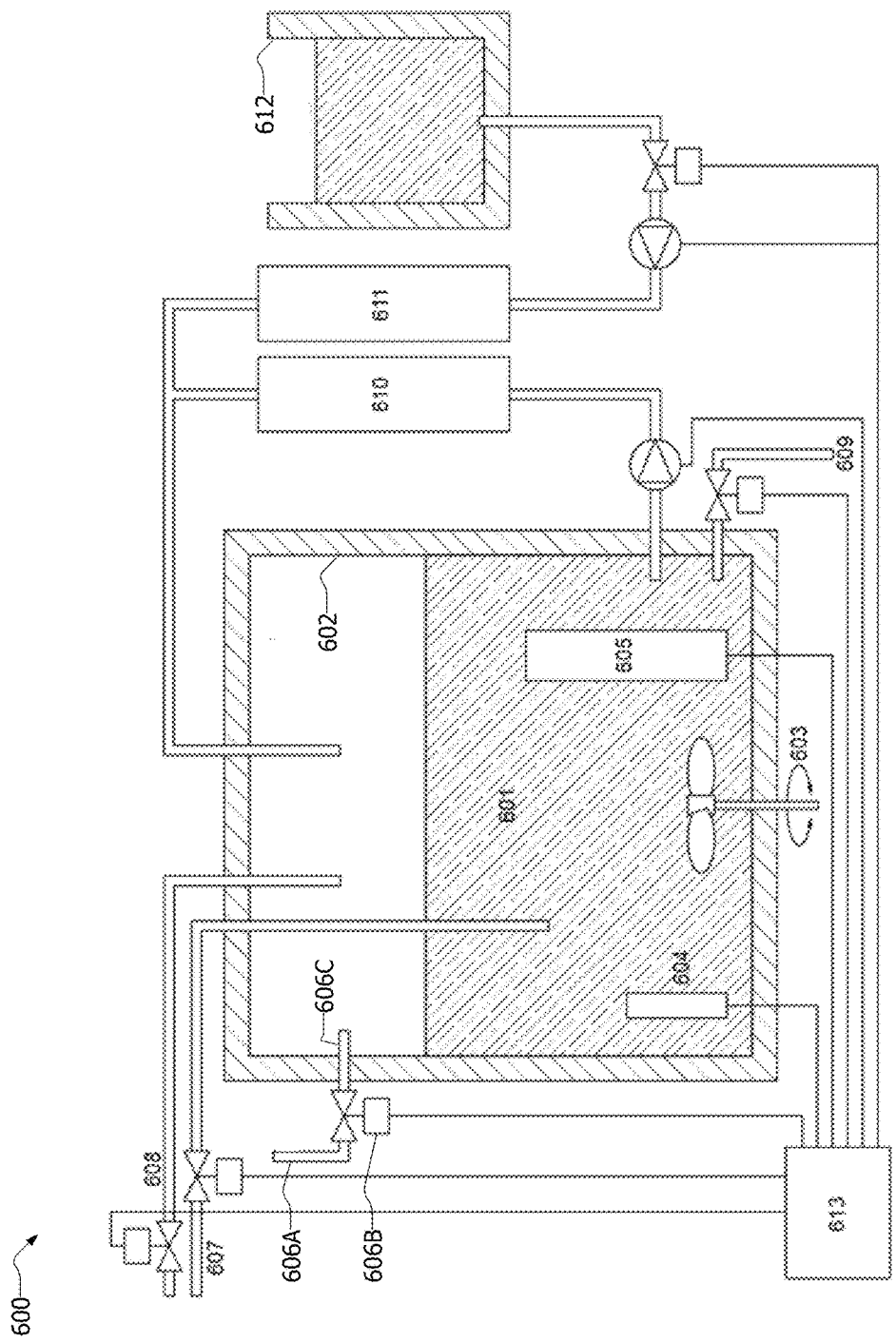
FIG. 6 is a schematic drawing showing a system for monomer polymerization for lens creation.

A resin conditioning and reservoir apparatus is used to hold the liquid resin and maintain its chemical composition in an appropriate and constant state. One embodiment of a resin conditioning and reservoir apparatus 600 is shown in FIG. 6. The liquid resin 601 is held inside a closed tank 602. A set of sensors, actuators and pipes that run in and out of the tank with corresponding valves and pumps are controlled by controller 613 that includes electronics and software. A mixing mechanism 603 is provided in the tank 602 to actuate, stir and/or mix the components of the resin so the components of the resin are kept thoroughly mixed and uniformly distributed. Oxygen, clean and dry air, or any preferred mix of gases can be pumped or bubbled into the resin through conduit 607 to increase solubility and help mixing. Also, a preferred gas can be introduced in the tank 602 to control the partial pressures of each gas in the atmosphere inside the chamber through pipe 608. A venting mechanism is provided to allow for changes in the composition of the atmospheric component inside the tank, and to control internal pressure. The venting mechanism may include components including pipes, valves and pumps. In the embodiment shown in FIG. 6, the venting may be achieved with pipe 606A and 606C and valve 606B connected with and controlled by controller 613. Sensors 604 are included in the tank 602. In one embodiment, a typical sensor array allows for measuring physical and chemical parameters such as temperature, oxygen concentration, nitrogen concentration, and the like. Either or both pipe 608 and/or 606A may be used to create a vacuum inside the tank to degas the resin. An oxygen scavenger mechanism (not shown) may optionally be included in the tank to degas the resin. A heater 605 may be included in the tank 602 to control temperature of the resin 601. The pipe 609 is used to extract the resin and deliver it to a polymerization apparatus like those shown in FIGS. 7A and 7B, described below.

A filtering system 610 consisting of a pump/valve mechanism and a filter is connected to the tank 602 to remove particles that would interfere with production of lenses, impeding lens formation and/or reducing lens quality. In one embodiment, particles having size above 0.5 microns are removed by the filtering system 610. In addition, the filtering system 610 may remove gel-type polymer formed by spontaneous polymerization or during the printing process. The filtering system 610 may work persistently in a closed loop or at specified time intervals, depending on the particular characteristics of the resin and the polymerization process. The filtering system may be coupled to and controlled by controller 613.

A resin recovery system 612 may be included in the resin conditioning and reservoir apparatus 600. Remnants of liquid resin from previous polymerization processes may be poured into tank 612, filtered via filter 611 and incorporated into the conditioning and reservoir apparatus. Concentration of initiator and inhibitors can be measured in the remnants of resin (for example, by means of well-known spectroscopic techniques) prior to introducing the remnants to the tank 612 or as the resin seats on the tank. Concentration of the components of the resin may be adjusted by adding appropriate amounts of inhibitor, initiator and/or monomer/oligomer prior to the introduction of the resin into the conditioning/reservoir tank 602.

Polymerization Apparatus

Figure 7A:
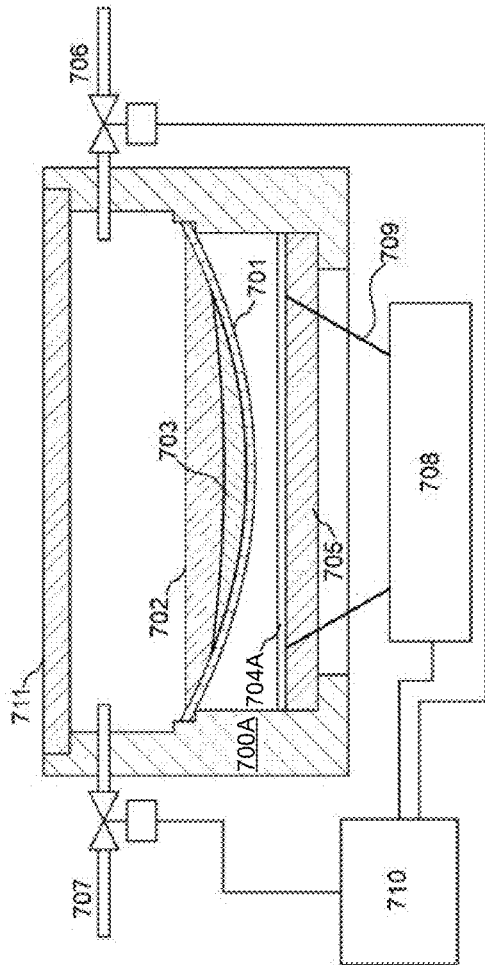
FIG. 7A is a schematic drawing showing a first version of a polymerization apparatus.
Figure 7B:
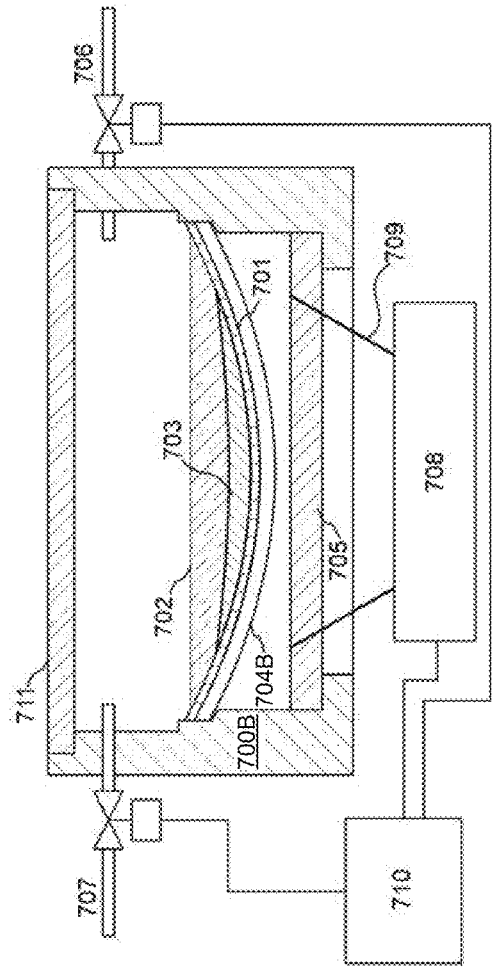
FIG. 7B is a schematic drawing showing a second version of a polymerization apparatus.

Referring now to FIGS. 7A and 7B, two exemplary embodiments of a polymerization apparatus are shown. The polymerization apparatus is composed of a chamber 700A/700B where resin 702 is placed is such a way that UV light passes through the bottom glass plate 705, the optical diffuser 704A/704B, and the substrate 701 and irradiates the resin 702. Formation of a lens occurs inside the polymerization apparatus. The chamber 700A/700B holds and encloses the components required to achieve the polymerization except for the UV source 708. The top 711 and bottom 705 are glass plates or other appropriate transparent material. Within the chamber 700A/700B, a substrate 701 sits in a bed, table, grooved area or other supportive structure (not shown) and/or or may be held in place by clips, tabs or other fastening device (not shown) to the walls or extensions to the walls of chamber 700A/700 B. Resin 702 is poured in the concave part of the substrate 701. Curing radiation (that is, UV light) 709 is emitted from the light source 708. The light source 708 may be a scanning laser or a DLP. Curing radiation passes through the bottom transparent plate 705 and is diffused by optical diffuser 704A/704B. Diffused light then propagates through the substrate 701 and enters the resin 702, where the lens 703 is formed.

In both embodiments of the polymerization apparatus shown in FIGS. 7A and 7B, the gaseous atmosphere and pressure inside the chamber 700A/700B is controlled through venting components including input/output pipes 706 and 707. These pipes direct nitrogen, oxygen, air, a mix of these gases and/or other gases into the interior of the chamber 700A/700B. These pipes may also be used to create a vacuum inside the chamber to degas the resin 702. The venting component includes valves and pumps as well as pipes 706 and 707 for the input and output of gases. The valves and pumps of the venting components and the light source are controlled by controller 710. The appropriate selection of gases depends on the resin formulation. For example, an acrylic resin with a 50% mix of monofunctional and bifunctional monomer and a mix of initiator at 0.5% and inhibitor at 1% can be used. In this example, as there is an inhibitor, oxygen is removed from the conditioning and reservoir apparatus 600 and will also be removed from the polymerization chamber 700A/700B by venting nitrogen into the chamber. Polymerization may be performed in a low-pressure nitrogen atmosphere to avoid the creation of bubbles within the polymerized lens 703.

In operation, as curing radiation enters the resin 702 through the glass plate 705, a polymerization front is created that separates the liquid resin 702 from the polymerized part that becomes lens 703. As polymerization proceeds, the polymerization front moves away from the substrate surface, and the growing lens thickens.

The irradiance pattern emitted by light source 708 used to create the formed lens 703 is computed using equation (1)

(described above) and the BTDF of the diffuser 704, which provides the volumetric density of curing photons inside the resin. When the thickness of the formed lens 703 reaches the target value, the polymerization front will have the shape of the target surface, according to the optimization algorithm (8) (described above), the lens is completed, and the light source 708 is turned off.

In the embodiment shown in FIG. 7A, the diffuser 704A is flat and is located above and adjacent to the bottom 705. In the embodiment shown in FIG. 7B, the diffuser 704B is curved, having similar curvature of the convex side of the substrate 701. Further, in the embodiment shown in FIG. 7B, the diffuser 704B is located below and adjacent to the substrate 701. In one embodiment, the curved diffuser 704B may be constructed from transparent resin having light dispersing additives, such as calcium carbonate, glass, titanium. In some embodiments, the light dispersing additive has particles sized between 1 and 3 microns. It is preferable that the diameter of the diffuser 704A/704B is greater than or equal to the diameter of the substrate 701. That is, it is preferable that the diameter of the diffuser 704A/704B is not smaller than the diameter of the substrate 701.

In variations of these embodiments, the space between the substrate 701 and the diffuser 704A in the embodiment shown in FIG. 7A, or between the diffuser 701 and the bottom plate 705 in the embodiment shown in FIG. 7B, may be filled with a substance, preferably a liquid, to ensure index matching between the different surfaces to eliminate or reduce the reflection in these surfaces. This index matching liquid has the properties of being transparent and having a refractive index close to or matching that of the substrate and the diffuser. In one embodiment, when the substrate is CR-39® and acrylate is the diffuser, the index matching fluid glycerin (having a refractive index of 1.47) may be used.

In some embodiments, the upper window glass 711 is removed.

Figure 8:
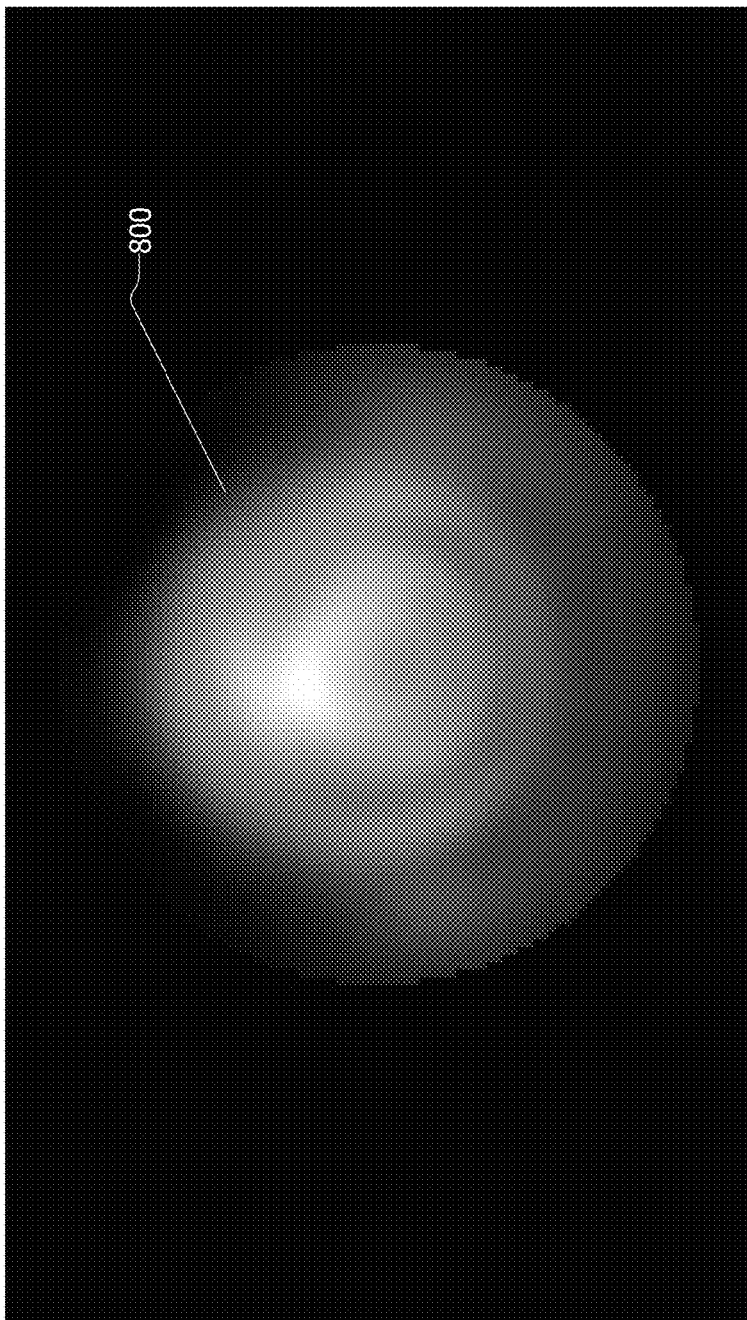
FIG. 8 is an image showing an input irradiance pattern.
Figure 9:
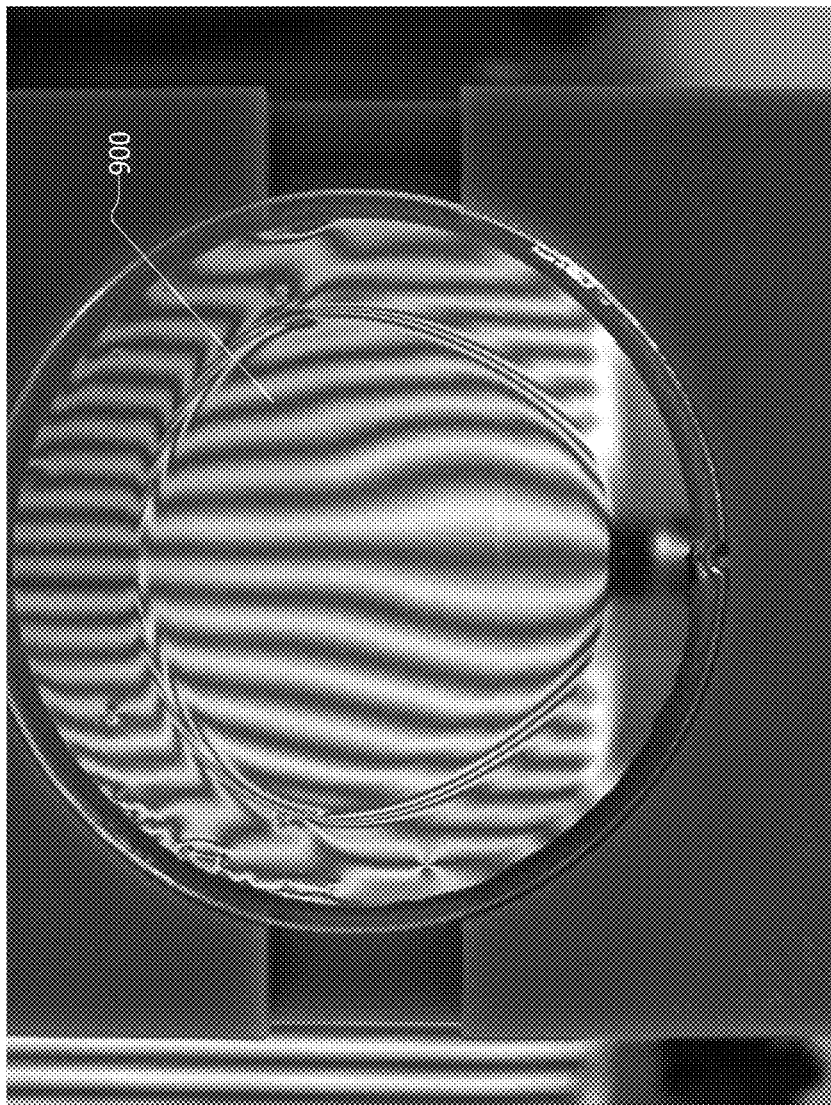
FIG. 9 is an image showing deflection of fringe patterns.

Referring now to FIG. 8, an example of a possible input light pattern 800 applied via the polymerization apparatus shown in FIG. 7A is shown. This pattern may be projected for 60 seconds, or other appropriate time, to produce a polymerization front with varying curvature to create lens 703 as a progressive addition lens. Referring now to FIG. 9, the lens 900 resulting from application of the methods described herein using the polymerization apparatus shown in FIG. 7A with the input pattern shown in FIG. 8 is shown.

Metrology Apparatus

Figure 10:
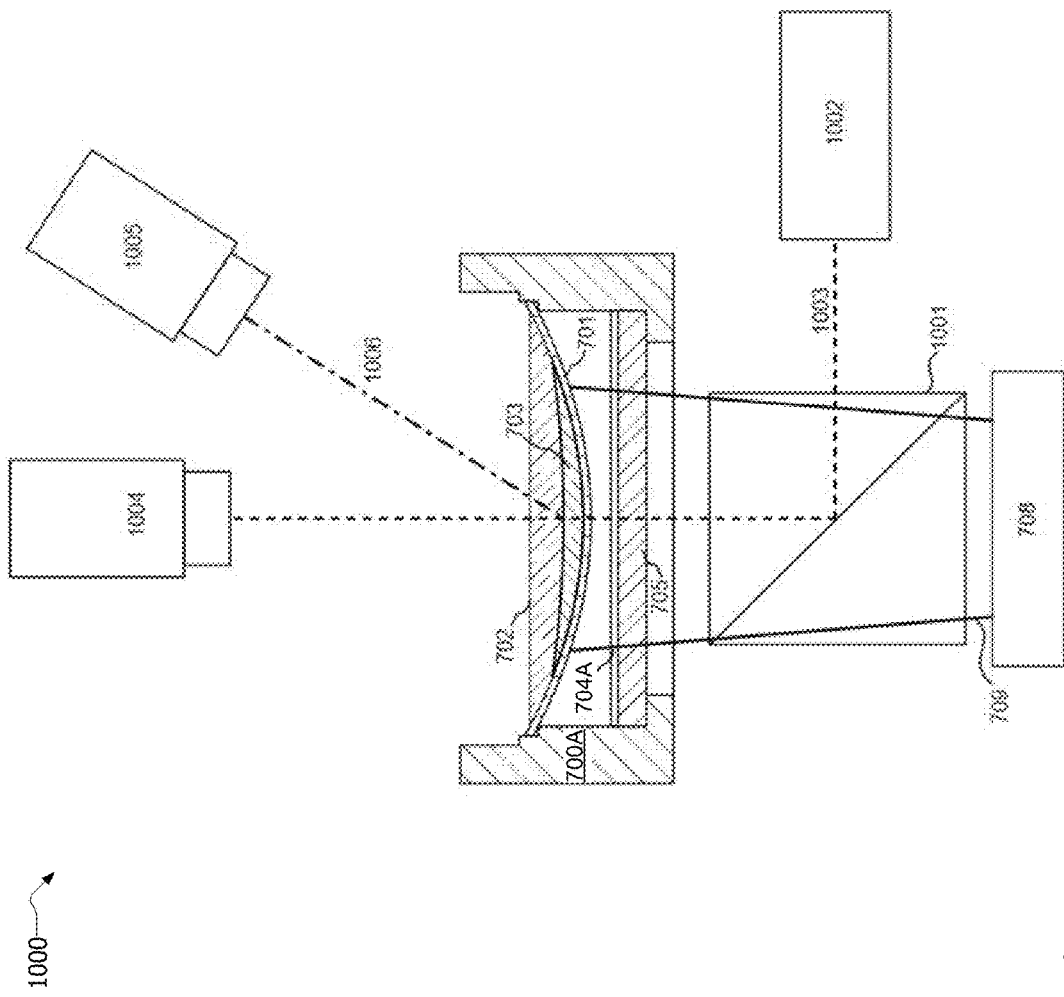
FIG. 10 is a schematic drawing showing an exemplar metrology apparatus.

An additional module can be attached to the polymerization apparatus shown in FIGS. 7A and 7B to make real time measurements and to provide feedback to correct or improve the light input pattern during the polymerization process. Referring now to FIG. 10, an embodiment of a metrology apparatus 1000 is shown. Included in the metrology apparatus 1000 is the polymerization apparatus shown in FIG. 7A. In this embodiment, the polymerization apparatus from FIG. 7A is used without the upper glass 711. The metrology apparatus 1000 includes a thermal camera 1005 to monitor in real time the temperature distribution of the resin 702 by sensing thermal radiation 1006 in the resin 702. As polymerization is an exothermic reaction, the light input pattern, which is spatially dependent, produces a higher rate of polymerization where it provides a higher photon density. Accordingly, the light input pattern, the shape of the polymerization front over time, and temperature distribution in the resin are correlated. Unexpected variations in the temperature distribution in the resin will similarly correlate with lack of homogeneity of the resin, with the presence of gel-type precipitates, or other impurities. To use a thermal camera 1005, the top glass plate of the polymerization chamber is removed as it is opaque to thermal radiation 1006.

In some embodiments, the metrology apparatus 1000 includes an additional secondary system is used to monitor the shape of the polymerization front as it evolves during the polymerization process. This secondary system evaluates topography with ultrasonic waves.

Referring again to the metrology apparatus 1000 in FIG. 10, an optical system is depicted using camera 1004. Camera 1004 uses low-wavelength light that cannot polymerize the resin to evaluate the formation of the lens and/or the polymerization front. For example, the camera 1004 may use red light with a wavelength of 635 nm, or near-infrared light with a wavelength of 780 nm. The camera 1004 may use light having other wavelengths that do not interfere with polymerization of the resin. In one embodiment of the metrology apparatus, a projector of structured light projects fringe patterns to shine structured low-wavelength light from above to the resin 702, and a camera 1004 images the light reflected from the polymerization front. The polymerization front reflects due to the variation of refractive index between the liquid resin and the polymer.

The metrology apparatus 1000 may include, additionally or alternatively, a light source 1002 to send structured low-wavelength light beam 1003 from below. This may be accomplished by transmission of a measuring light beam 1003 through the lens 703 which is detected with camera 1004. In this embodiment, the measuring light beam 1003 and the curing light 709 are mixed by a beam-splitter 1001, for example a dichroic beam-splitter that will not affect the amount of curing light projected.

Other embodiments of the metrology apparatus 1000 may include other or additional sensors, such IR cameras, ultrasound sensors, and others.

Resin Drainage Apparatus

After the lens has been formed by the polymerization apparatus, remaining resin may be drained and reused. More specifically, after the polymerization apparatus has completed the target shape and formed the lens with the target thickness, the projector is turned off and projection of the input pattern stops. The substrate containing the lens and remaining non-polymerized resin are then removed from the polymerization apparatus. This can be achieved manually or using an automated system. After the lens is completed, the remaining liquid resin is removed or otherwise drained from the polymerization apparatus to avoid unwanted polymerization of the resin.

Figure 11:
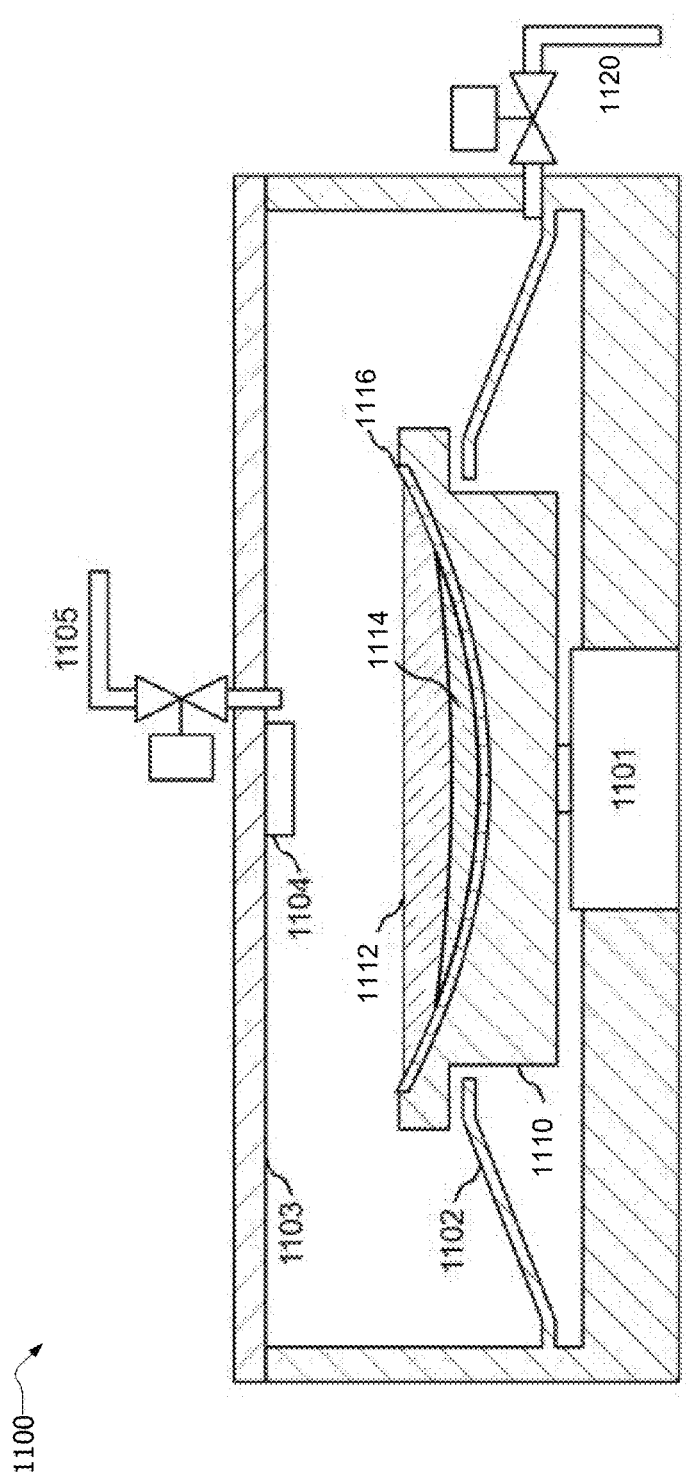
FIG. 11 is a schematic drawing showing an exemplar resign drainage apparatus.

Referring now to FIG. 11, an exemplary resin drainage apparatus 1100 is shown. The substrate 1116 with the formed lens 1114 and remaining liquid resin 1112 are placed and firmly attached to a base 1110 and placed on a spinning machine 1101. The base 1110, substrate 1116, lens 1114 and remaining resin 1112 are rotated by spinning machine 1101. The centrifugal force moves the remaining liquid resin away and off the lens 1114 and substrate 1116, and into the receptacle formed by a cone-shaped shelf 1102. The speed of the spinning machine 1101 along with the viscosity of the resin 1112, which in turn is largely dependent on the temperature, determines the amount of resin remaining on the lens. The cover 1103 blocks resin from flying out of the resin drainage apparatus 1100. The resin collected by the spinner on top of the cone-shaped shelf 1102 is recovered with drain pipe 1120 to be recycled and reused as described (above) regarding FIG. 6. The collection of remaining resin for recycling and reuse can be done automatically, the resin being pumped from drain pipe 1120 from the resin drainage apparatus 1100 of FIG. 11 to the system of FIG. 6.

When the volume of remaining resin is large, excess resin can be dumped before spinning by tilting the substrate. For those resin formulations in which the amount of gelified resin is too large, the remaining resin can be discarded, and appropriate solvents can be used to remove the non-cured resin from the substrate-lens pair.

In another embodiment, after the resin has drained through pipe 1120, a precure of the thin layer of liquid resin remaining on top of the lens surface can be achieved via a diffuse UV light source 1104 included on the underside of the cover 1103. According to this embodiment, when this layer is precured, a small amount of liquid hard coating lacquer can be poured on the lens via applicator 1105 which may be integrated into the cover 1103. The lacquer can be spun off by an additional rotation cycle of the spinning machine 1101, leaving a uniform layer than can be further photocured or thermally cured by means of heaters (not shown) that may be included in resin drainage apparatus 1100.

Post-Curing Apparatus

Figure 12:
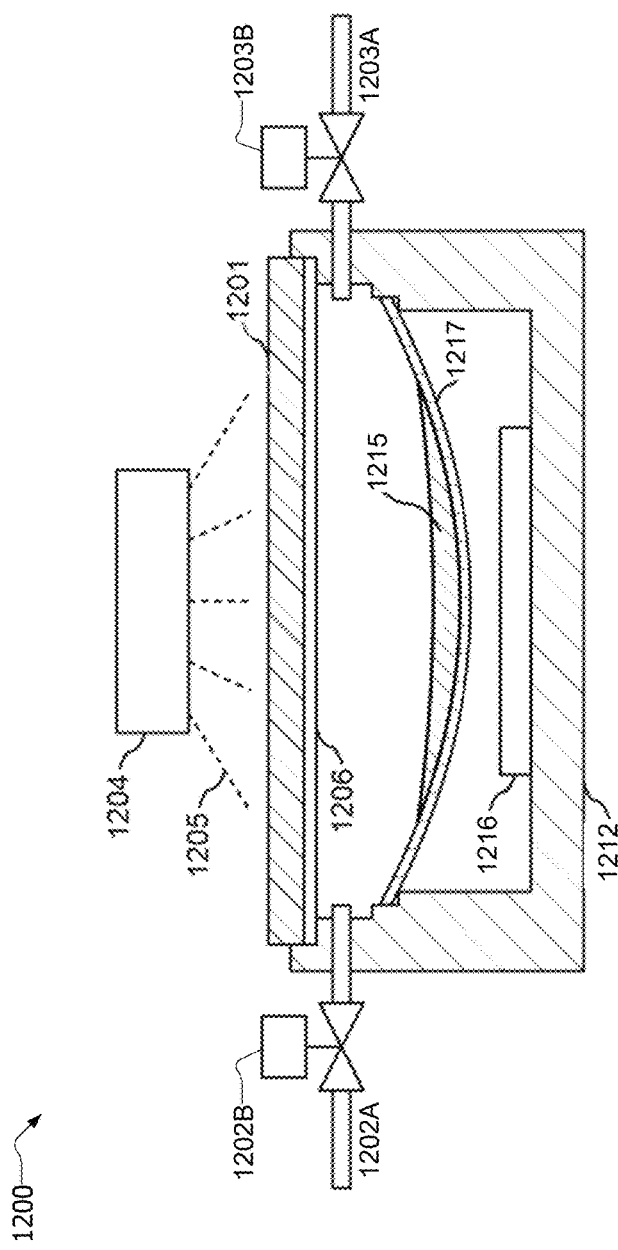
FIG. 12 is a schematic drawing showing an exemplar post-curing apparatus.

Depending on the formulation and properties of the resin and related process parameters for a particular lens, post curing actions may be performed. Referring now to FIG. 12, an embodiment of a post-curing apparatus 1200 is shown. The post-curing apparatus 1200 may be used after remaining liquid resin has been drained in the spinner-type resin drainage apparatus 1100 of FIG. 11. In some embodiments, the resin drainage apparatus 1100 does not incorporate UV sources and/or thermal sources, so the film of liquid resin left on top of the formed lens after performing actions using the resin drainage apparatus 1100 must be cured using another apparatus. In particular, the resin drainage apparatus 1100 may lack a venting system that would provide oxygen-free atmosphere. In that case, the thin layer left on top of the lens cannot be cured, as it is a few microns thick and oxygen is continuously diffusing from the atmosphere. In that case, an additional apparatus may be needed, a post-curing apparatus.

Referring to FIG. 12, the post-curing apparatus 1200 includes a chamber 1212 into which the substrate 1217 and the lens 1215 are placed with a sealed lid 1201 transparent to UV radiation. Input and output pipes 1202A and 1203A are included through the walls of the chamber 1212 with control valves 1202B and 1203B to allow for the maintenance and control of the appropriate atmosphere (that is, gaseous mix) within the chamber 1212. Depending on the resin, a neutral nitrogen atmosphere may be used at high pressure to avoid bubble formation on the lens 1215. If the resin is properly degassed, low pressure nitrogen or a vacuum can be used to expel the oxygen from the resin. After the atmosphere within the chamber 1212 and the lens 1215 are free from oxygen, a source 1204 of curing radiation 1205 (for example, a UV light source) is activated to cure the remaining layer on the lens 1215. Heaters 1216 may optionally be included and integrated with the bottom of the chamber 1212. The heaters 1216 may be used to improve mobility of the non-reacted monomer inside the polymer matrix and increase the degree of conversion c (see Equation 5 above).

A diffuser 1206 may be incorporated in the lid 1201 to homogenize the irradiance 1205 reaching the thin layer of liquid resin on the lens 1215 from the light source 1204.

Output Product—A Lens

The output product of the systems and methods described herein is a lens, namely a substrate/formed-lens composite. In some cases, the formed lens will be detached from the substrate and the formed lens will be the final lens. In other cases, the formed lens will not be separate from the substrate, such that the two components together form the eyewear lens. In this second case, the eyewear lens might have some optical properties inherited from the substrate. For example, the substrate can be polarized, tinted or photochromic, so long as a sufficient amount of curing radiation can pass through the substrate to polymerize the forming lens. The substrate may also incorporate an antireflective coating or hard coating on its convex surface. Further, the substrate may provide power. Combining a substrate with the formed lens provides great advantages as it allows to for the production of spectacle lenses not limited to the optical properties of the polymerized resin.

In another embodiment the formed lens is detached from the substrate. The resulting product is the formed lens comprised entirely of polymerized resin. The advantage of this embodiment is that the substrate can be reused.

The Method

Figure 13:
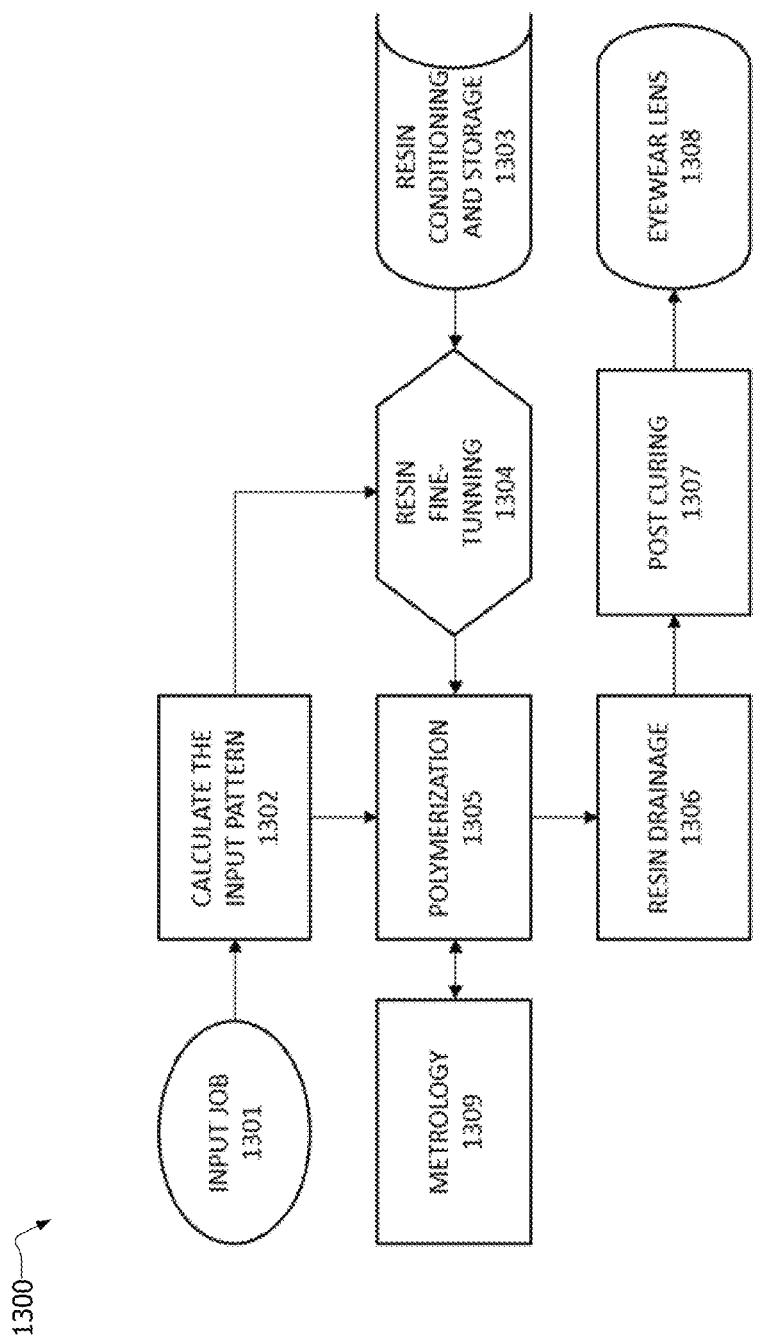
FIG. 13 is a flow chart showing the actions taken to form a lens using the systems and methods described herein.

Referring now to FIG. 13, the method 1300 used to produce a spectacle lens using the apparatuses and methods described above is shown. Referring to block 1301, an input job is received. The input job includes information required for manufacturing a lens, including: geometry of the free-form surface, expected or preferred thickness, geometry of the fixed surface, expected or desired refractive index, lens diameter or contour shape, user parameters, user lifestyle parameters, and others. The input job specification may include some or all of the information listed. As used in the input job, user parameters include nasopupilar distance; frame properties such as frame pantoscopic, wrapping angle, frame vertex distance; fields of view; reading distance; working distance; age; health; and other parameters. As used in the input job, user lifestyle may be specification of the primary activity or activities of the user, including sports—outdoor, indoor, a specific sport such as swimming and running—driving, reading, desk job, and/or a career, such as, for example, chef, teacher, lawyer, bus driver, etc.

Upon receipt of the input job, lens creation instructions are determined. The lens creation instructions (or requirements) include an input pattern for UV light and a resin composition. The irradiation pattern or input pattern is calculated (as shown in block 1302) such that the polymerization front for a given exposure time coincides with the desired geometry of the free-form lens surface. This calculation of the input pattern consists of an optimization process for every point inside the resin to be irradiated by multiple points from the diffuser.

Specifically, the calculation begins with the lens surface specified in the input job. The input pattern of light is calculated such that the polymerization front after a time "t" coincides with the objective surface including evaluation of the following.

a. The diffuser receives the directional light from the light source, and each point of the diffuser emits in each direction according to its BTDF function.

b. Each point in the resin receives light from multiple source locations in the diffuser.

c. The light received by the resin initiates the photochemical reactions described in Equation 1.

d. The photochemical reactions change the degree of conversion pursuant to Equation 5 at each point in the resin.

e. The polymerization front is defined as the points inside the resin that reach a degree for conversion c equal to the critical conversion value.

During the calculation (1302), resin composition is also determined such that the creation instructions include the irradiation pattern and resin composition. The resin composition defines the composition of the resin. The calculation (1302) also determines the amount of liquid resin that will be needed to create the formed lens with the needed diameter. The composition of the resin includes particular amounts of photo-initiator and inhibitor (optional) depending on the information in the input job. For example, lenses with greater thickness might require less light absorption which is obtained with less photo-initiator or a larger amount of inhibitor. This is why the creation instructions include determination of both the irradiation pattern and the resin composition. Then, resin is conditioned and stored according to the procedure described above regarding FIG. 6 (as shown in block 1303). The composition of the resin can be adjusted to meet the requirements of the creation instructions by changing the concentration of photo-initiator and/or inhibitor.

Next, polymerization is performed (as shown in block 1305). The polymerization begins with placing a new clean substrate in the polymerization chamber, followed by pouring the resin (according to block 1304) into the polymerization chamber. The polymerization continues with radiating the diffuser with the input pattern that provides the correct photon density distribution within the resin to achieve the lens surface specified in the input job according to the irradiation pattern in the creation instructions. During the polymerization (1305), the information from the metrology apparatus may be used to adjust and/or correct the input patterns (as shown in block 1309).

Once the formed lens is created in the polymerization chamber, the resin is drained from the polymerization chamber (as shown in block 1306), resulting in an object composed of the substrate and the formed lens covered by a gel layer.

During post-curing (as shown in block 1307), the gel layer is polymerized. The formed lens may then be detached from the substrate. The result is an eyewear lens (as shown in block 1308). In some embodiments, when the formed lens is not detached from the substrate, the output product is the composite of the substrate and the formed lens.

After removal, the formed lens may be cut before placing the lens in a frame for wearing. Other actions may be taken on the formed lens, such as applying an antireflective coating or hard coating.

CLOSING COMMENTS

Throughout this description, the embodiments and examples shown should be considered as exemplars, rather than limitations on the apparatus and procedures disclosed or claimed. Although many of the examples presented herein involve specific combinations of method acts, apparatuses, components or system elements, it should be understood that these may be combined in other ways to accomplish the same objectives. With regard to methods, processes and flowcharts, additional and fewer actions may be taken, and the actions as shown and described may be combined or further refined to achieve the methods described herein. Acts, components, apparatuses, elements and features discussed in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for creating a lens, the method comprising:
   receiving input information including a lens prescription;
   calculating creation instructions based on the input information, the creation instructions including: 1) an irradiation pattern, and 2) an exposure time to use a light transmission of the irradiation pattern to form a lens having the lens prescription;
   initiating the light transmission of the irradiation pattern from a light source through a diffuser into a container holding resin held within a substrate, wherein each point in a thickness of the resin sufficient to form the lens is illuminated by at least 10% of an area of the diffuser; and
   stopping the light transmission after the exposure time to form the lens, wherein the lens meets the creation instructions, wherein a single polymerization front has the shape of a target surface of the lens that meets the creation instructions, wherein the irradiation pattern is a single irradiation pattern that coincides with forming the lens having the lens prescription, and wherein the substrate is selected from the group including poly(allyl diglycol carbonate), polycarbonate, polyurethane-based plastic or glass.

2. The method of claim 1 wherein at least 15% of the area of the diffuser receives light from the light source.

3. The method of claim 1 wherein a diameter of the diffuser is greater than or equal to a diameter of the substrate.

4. The method of claim 1 further comprising draining the container of the resin.

5. The method of claim 4 further comprising spinning the formed lens to remove remaining resin.

6. The method of claim 4 further comprising applying heat and/or light to the formed lens to complete curing of the formed lens.

7. The method of claim 4 further comprising removing the formed lens from the substrate.

8. The method of claim 1 wherein the creation instructions include 3) a resin composition.

9. The method of claim 8 wherein the resin composition includes specific amounts, portions or concentrations of an inhibitor, a photo initiator, and a monomer or oligomer.

10. The method of claim 9 wherein the monomer is selected from the group including acrylate, epoxy, methacrylate, isocyanate, polythiol, thioacrylate, thiomethacrylate.

11. The method of claim 9 wherein the inhibitor is selected from the group including: oxygen and hydroquinone.

12. The method of claim 9 wherein the photo initiator is selected from the group including: benzophenone, BAPO (bisacylphosphine oxides), acetophenone, 1-[4-(2-Hydroxyethoxy)-phenyl]-2-hydroxy-2-methyl-1-propane-1-one, alpha amino ketones, HAP (2-Hydroxy-2-methyl-1-phenylpropan-1-one) and TPO (Diphenyl(2,4,6-trimethylbenzoyl) phosphine oxide), aryldiazonium salts, triarylsulfonium salts, ferrocenium salts, diaryliodonium salts.

13. The method of claim 9 wherein the diffuser is opal glass, white glass, or acrylate with light diffusing additives.

14. The method of claim 1 further comprising spinning the formed lens and applying a hard coating.

15. The method of claim 1 wherein the exposure time is a single period of time.

16. A method for creating a lens, the method comprising:
receiving input information including a lens prescription;
calculating creation instructions based on the input information, the creation instructions including: 1) an irradiation pattern, and 2) an exposure time to use a light transmission of the irradiation pattern to form a lens having the lens prescription;
initiating the light transmission of the irradiation pattern from a light source through a diffuser into a container holding resin held within a substrate, wherein each point in a thickness of the resin sufficient to form the lens is illuminated by at least 10% of an area of the diffuser; and
stopping the light transmission after the exposure time to form the lens, wherein the lens meets the creation instructions, wherein a single polymerization front has the shape of a target surface of the lens that meets the creation instructions, wherein the irradiation pattern is a single irradiation pattern that coincides with forming the lens having the lens prescription, and wherein the substrate includes embedded electronic circuits or embedded image formation systems.

17. The method of claim 16 wherein the creation instructions include 3) a resin composition.

18. A method for creating a lens, the method comprising:
receiving input information including a lens prescription;
calculating creation instructions based on the input information, the creation instructions including: 1) an irradiation pattern, and 2) an exposure time to use a light transmission of the irradiation pattern to form a lens having the lens prescription;
initiating the light transmission of the irradiation pattern from a light source through a diffuser into a container holding resin held within a substrate, wherein each point in a thickness of the resin sufficient to form the lens is illuminated by at least 10% of an area of the diffuser; and
stopping the light transmission after the exposure time to form the lens, wherein the lens meets the creation instructions, wherein a single polymerization front has the shape of a target surface of the lens that meets the creation instructions, wherein the irradiation pattern is a single irradiation pattern that coincides with forming the lens having the lens prescription, and wherein the substrate is polarized or photochromic.

19. The method of claim 18 wherein the creation instructions include 3) a resin composition.

20. A method for creating a lens, the method comprising:
receiving input information including a lens prescription;
calculating creation instructions based on the input information, the creation instructions including: 1) an irradiation pattern, and 2) an exposure time to use a light transmission of the irradiation pattern to form a lens having the lens prescription;
initiating the light transmission of the irradiation pattern from a light source through a diffuser into a container holding resin held within a substrate, wherein each point in a thickness of the resin sufficient to form the lens is illuminated by at least 10% of an area of the diffuser; and
stopping the light transmission after the exposure time to form the lens, wherein the lens meets the creation instructions, wherein a single polymerization front has the shape of a target surface of the lens that meets the creation instructions, wherein the irradiation pattern is a single irradiation pattern that coincides with forming the lens having the lens prescription, and wherein the substrate includes a convex surface, and the substrate incorporates an antireflective coating or a hard coating treatment on the convex surface.

21. The method of claim 20 wherein the creation instructions include 3) a resin composition.

22. A method for creating a lens, the method comprising:
receiving input information including a lens prescription;
calculating creation instructions based on the input information, the creation instructions including: 1) an irradiation pattern, and 2) an exposure time to use a light transmission of the irradiation pattern to form a lens having the lens prescription;
initiating the light transmission of the irradiation pattern from a light source through a diffuser into a container holding resin held within a substrate, wherein each point in a thickness of the resin sufficient to form the lens is illuminated by at least 10% of an area of the diffuser; and
stopping the light transmission after the exposure time to form the lens, wherein the lens meets the creation instructions, wherein a single polymerization front has the shape of a target surface of the lens that meets the creation instructions, wherein the irradiation pattern is a single irradiation pattern that coincides with forming the lens having the lens prescription, and wherein the lens includes the substrate and the thickness of the illuminated resins resin.

23. The method of claim 22 wherein the creation instructions include 3) a resin composition.

* * * * *